(12) United States Patent
Xia

(10) Patent No.: US 10,421,185 B2
(45) Date of Patent: Sep. 24, 2019

(54) FOLLOW-UP CONTROL DEVICE FOR AN EXOSKELETON ROBOT

(71) Applicant: Hangzhou Qisu Technology Co., Ltd., Hangzhou (CN)

(72) Inventor: Nan Xia, Shaoxing (CN)

(73) Assignee: Hangzhou Qisu Technology Co., Ltd., Hangzhou (CN)

( * ) Notice: Subject to any disclaimer, the term of this patent is extended or adjusted under 35 U.S.C. 154(b) by 119 days.

(21) Appl. No.: 15/579,941

(22) PCT Filed: Jun. 7, 2016

(86) PCT No.: PCT/CN2016/085159
§ 371 (c)(1),
(2) Date: Dec. 6, 2017

(87) PCT Pub. No.: WO2016/197923
PCT Pub. Date: Dec. 15, 2016

(65) Prior Publication Data
US 2018/0361570 A1 Dec. 20, 2018

(30) Foreign Application Priority Data
Jun. 12, 2015 (CN) .......................... 2015 1 0321729

(51) Int. Cl.
*B25J 9/10* (2006.01)
*A61H 3/00* (2006.01)
(Continued)

(52) U.S. Cl.
CPC ............ *B25J 9/101* (2013.01); *A61H 1/0237* (2013.01); *A61H 1/0274* (2013.01); *A61H 3/00* (2013.01);
(Continued)

(58) Field of Classification Search
CPC ...... B25J 9/0006; B25J 9/0024; B25J 9/0027; B25J 9/101; B25J 9/12; B25J 9/123;
(Continued)

(56) References Cited

U.S. PATENT DOCUMENTS 7,883,546 B2 * 2/2011 Kazerooni ................ A61F 2/68
623/27
8,801,641 B2 * 8/2014 Kazerooni ............. A61H 3/008
128/898
(Continued)

FOREIGN PATENT DOCUMENTS

| CN | 201870775 U | 6/2011 |
| CN | 102499859 A | 6/2012 |

(Continued)

*Primary Examiner* — Adam D Rogers
(74) *Attorney, Agent, or Firm* — Gokalp Bayramoglu

(57) ABSTRACT

A follow-up control device for an exoskeleton robot includes an upper arm and a lower arm, and the lower end of the upper arm and the upper end of the lower arm are connected via a rotatable joint. An active press block capable of sliding in a direction perpendicular to an axis is arranged on the upper arm or the lower arm, the active press block is bonded with a human body, two micro switches are arranged on the upper arm or the lower arm in correspondence to the active press block, a power device for driving the rotation is arranged between the upper arm and the lower arm, and the two micro switches respectively control the forward and backward motion of the power device.

14 Claims, 3 Drawing Sheets

(51) Int. Cl.
  *B25J 9/00* (2006.01)
  *B25J 9/12* (2006.01)
  *B25J 9/14* (2006.01)
  *A61H 1/02* (2006.01)

(52) U.S. Cl.
  CPC .............. *B25J 9/0006* (2013.01); *B25J 9/12* (2013.01); *B25J 9/144* (2013.01); *A61H 2003/007* (2013.01); *A61H 2201/123* (2013.01); *A61H 2201/1246* (2013.01); *A61H 2201/1659* (2013.01); *A61H 2201/1676* (2013.01); *A61H 2201/5066* (2013.01)

(58) Field of Classification Search
  CPC ...... B25J 9/144; A61H 3/00; A61H 2003/007; A61H 2201/123; A61H 2201/1246; A61H 2201/1659; A61H 2201/5066; A61H 1/0237; A61H 1/0274; A61H 2201/1676
  See application file for complete search history.

(56) References Cited

U.S. PATENT DOCUMENTS

| | | | |
|---|---|---|---|
| 9,011,354 B2 * | 4/2015 | Angold | A61H 1/0255 601/34 |
| 9,744,093 B2 * | 8/2017 | Tung | A61H 3/00 |
| 2012/0004581 A1 | 1/2012 | Dinon | |
| 2015/0321340 A1 * | 11/2015 | Smith | B25J 9/10 74/490.01 |
| 2016/0213549 A1 * | 7/2016 | Iida | A61H 1/024 |
| 2017/0252254 A1 * | 9/2017 | Velazquez Nino | A61H 3/00 |

FOREIGN PATENT DOCUMENTS

| | | |
|---|---|---|
| CN | 103040586 A | 4/2013 |
| CN | 103536426 A | 1/2014 |
| CN | 203524949 U | 4/2014 |
| CN | 105078708 A | 11/2015 |
| CN | 204814699 U | 12/2015 |
| EP | 2985009 A2 * | 2/2016 ............ B25J 9/0006 |

* cited by examiner

FOLLOW-UP CONTROL DEVICE FOR AN EXOSKELETON ROBOT

CROSS REFERENCE TO RELATED APPLICATION

This application is the national phase entry of International Application No. PCT/CN2016/085159, filed on Jun. 7, 2016, which is based upon and claims priority to Chinese Patent Application No. 201510321729.3, filed on Jun. 12, 2015, the entire contents of which are incorporated herein by reference.

TECHNICAL FIELD

The invention relates to a robot control device, particularly a servo control device for an exoskeleton robot.

BACKGROUND

With the development of society and economy, people's demand for robots is increasing day by day. However, since artificial intelligence has not been developed to sustain independent operation, robots at present need manual intervention or pre-program to perform fixed tasks. Under such context, exoskeleton robot with perfect human-machine interaction has drawn more and more attentions from researchers. Moreover, exoskeleton robots are endowed with powerful functions. For instance, it can facilitate limb injuries to receive rehabilitation therapy, for which exoskeleton can be fastened with injured limbs to control and drive limb movement. In addition, it can help the disabled with mobility problems to recover their exercise capacity, for which exoskeleton can be used to assist the disabled limbs, for lower limb injuries to walk again or upper limb injuries to pick up items again. As for a healthy person, exoskeleton can greatly improve everyone's exercise capacity, rendering ordinary person to lift objects of hundreds of pounds without efforts, or complete a long journey of tens of kilometers. Therefore, exoskeleton with extraordinary ability has a great potential for development in military, scientific research, industrial production and daily life, which is of great positive significance to promote socio-economic development.

There are several existing control methods for exoskeleton robots. For instance, direct manual control can be used for direct control of exoskeleton robots by pressing the operating buttons, which is difficult to ensure the coordination; pre-programmed control can be used where exoskeleton robots can only exercise based on the pre-set tracks with low degree of freedom; in addition, master-slave control can be used where exoskeleton robots can be divided into master exoskeleton fixed with human limbs and slave exoskeleton driven by external force. When the master exoskeleton is driven into motion by human body, there will be a differential motion between master and slave exoskeletons, for which the angular deviation signal between them can be generally detected by an angle sensor as the driving signal of slave exoskeleton. Despite of higher degree of freedom and better coordination as compared with the aforesaid methods, such control method, with higher requirements for relatively complicated driving structures and high-precision angle sensors, requires an angular difference between master and slave exoskeletons to generate the required driving force. Therefore, there could be a lag in exoskeleton motion, which will be particularly obvious when precision of angle sensors remains low.

SUMMARY OF THE INVENTION

The aim of the present invention is to solve problems such as poor coordination of exoskeleton robots with manual control as well as complicated structures and lagged motion of exoskeleton robots with master-slave control, providing a servo control device with better coordination and synchronism for exoskeleton robots.

The present invention adopts the following technical scheme to solve relevant technical problems. A follow-up control device for exoskeleton robot includes an upper arm and a lower arm. The lower end of upper arm is connected to the upper end of lower arm by a rotatable joint, the upper arm or lower arm is equipped with an active lock block that can slide along the direction in vertical with its own axis, the active lock block is bound with human body, the upper arm or lower arm is provided with two micro switches with opposite actuating directions to correspond with the active lock block, which can only trigger one of the micro switches at the same time, a power device is provided between the upper arm and lower arm to drive rotation, and the two micro switches can be used to control motion of power devices in positive and reverse directions respectively. Moreover, since the two micro switches are designed to correspond with two motion directions of the active lock block bound with human body, motion exercised by human body can drive the active lock block into motion vertical to the axis direction of upper arm or lower arm. Take the leg as an example, fixate the upper arm on outer thigh, lower arm on lower leg and joint on outer knee joint, and install the active lock block and micro switches on the upper arm. After the upper arm and active lock block are fixated with the thigh, another binding position of the upper arm and thigh will keep a certain distance away from the active lock block. When body walks, leg will flex and extend to produce a micro differential motion between the thigh and upper arm. Meanwhile, the active lock block will be driven to slide relative to the upper arm before one of the micro switches is actuated to drive the power device into motion, thus putting the upper and lower arm into the same flexion and extension movements. However, when body flexes and extends, the active lock block will be driven into motion in different directions, thus actuating different micro switches based on the direction of motion to realize servo motion of exoskeleton. As a result, the device can accurately actuate micro switches based on motion trend to realize better synchronicity and mobility when body exercises micro movements.

Preferably, the micro switches are located on the lateral side of upper arm, while two limit bars are located in the axis direction in a vertical direction to the lateral side of upper arm. Two micro switches are disposed between the two limit bars and protrude from ends of two limit bars respectively, the active lock block can be a sliding frame that is installed at both sides to slide along the limit bars, and the distance between two inner ends of sliding frame is larger than that between outer ends of two micro switches.

As another preferred scheme, the micro switches are located on the lateral side of lower arm, two limit bars are located in the axis direction, vertical to the lateral side of lower arm, two micro switches are disposed between the two limit bars and protrude from ends of two limit bars respectively, the active lock block can be a sliding frame that are installed at both sides to slide along the limit bars, and the distance between both inner ends of sliding frame is larger than that between outer ends of two micro switches. Therefore, whether installed on upper arm or lower arm, the micro switch can sensitively detect the motion trend of human body to realize servo motion of exoskeletons. As the active lock block features frame structures, the distance between both inner ends of the frame body has determined that only one micro switch could be actuated at the same time. However, limit bars can be used to prevent micro switches from any damages caused by violent motion of human body or create an unreturnable displacement. Meanwhile, limit bars can also be used to guide the active lock block.

Preferably, the two limit bars are also equipped with side sealing plates on their lateral sides to protect micro switches and prevent sliding frame from falling off.

Preferably, the sliding frame is also designed with connecting holes to be bound with human body on both ends.

Preferably, an electric cylinder can be used as the power device, which includes a cylinder body, a piston rod and a motor. Both ends of the cylinder body and piston rod are connected to the upper and lower arm respectively, the motor is installed at one side of the cylinder body, and the power device is installed between the cylinder body and motor.

Preferably, the upper and lower arms are made of multiple layers of connecting plate and insert panel that have consistent thickness and are alternatively stacked together, the end portion of connecting plate near the joint is longer than the end portion of insert panel, and the upper end of connecting plate on lower arm is inserted and connected with the lower end of connecting plate on upper arm by a joint pin at the junction. The layered structures may improve thickness of upper and lower arms and reduce possible twist at the joint position. Moreover, the connecting plate and insert panel are stacked together in layers, for which the length of stacked parts can be adjusted based on actual conditions to provide different adjustable length for upper and lower arms. However, where upper end of upper arm and lower end of lower arm require joint pieces for connection with other body parts, the role of insert panel can be exchanged with that of connecting plate. During installation, the power device shall be designed on the connecting plate of upper and lower arms to ensure stable driving force.

Preferably, the upper end of insert panel is longer than that of connecting plate on upper arm, and the lower end of insert panel is longer than that of connecting plate on lower arm.

Preferably, the position where upper and lower arms are bound with human body shall remain a certain distance away from the active lock block. Moreover, the upper and lower arms must be provided with better mobility and bound with human body at a position away from the active lock block to better reflect motion trend of human body.

As described in the present invention, the slideable active lock block installed in vertical with the upper and lower arm axis can be used to obtain micro motion trend of human body and actuate the power device in cooperation with micro switches, realizing real-time servo motion of exoskeleton and human body with better coordination, synchronism, simpler structures, lower cost and better economy.

DETAILED DESCRIPTION OF THE EMBODIMENT

The present invention will be further illustrated based on concrete embodiments and attached drawings.

Embodiment

Figure 1:
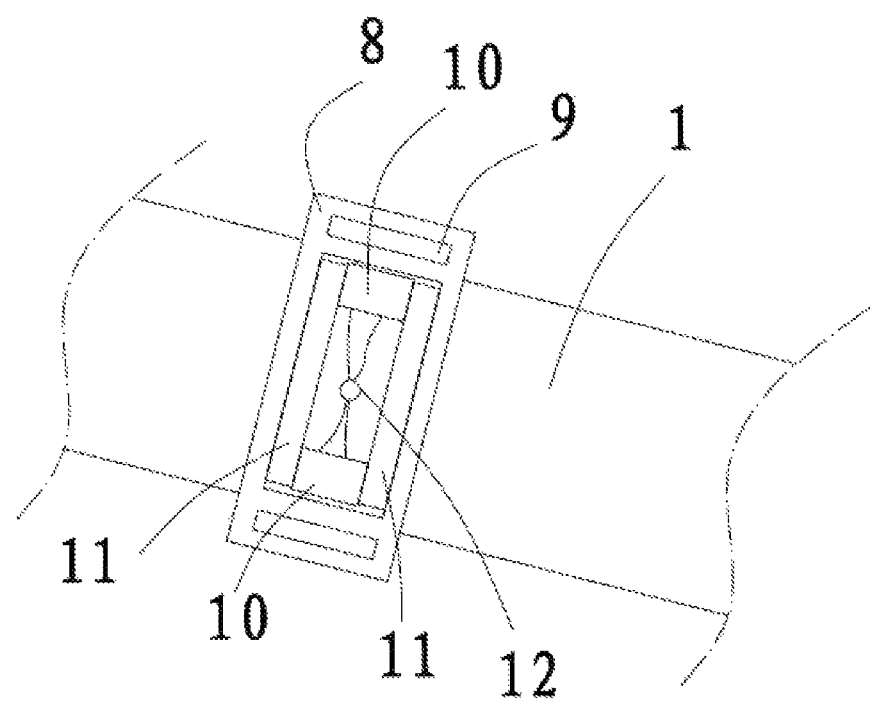
FIG. 1 is a structural diagram of the present invention.
Figure 3:
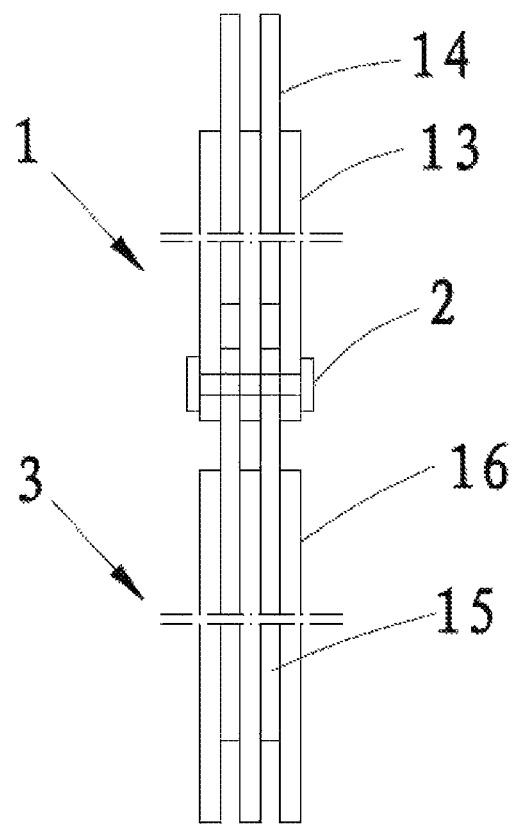
FIG. 3 is a schematic diagram of lateral structures for upper and lower arm mentioned in the present invention.
Note: 1. Upper arm; 2. Joint; 3. Lower arm; 4. Electric cylinder; 5. Motor; 6. Active lock block; 7. Side block panel; 8. Sliding frame; 9. Connecting hole; 10. Micro switch; 11. Limit bar; 12. Thread hole; 13. Connecting plate of upper arm; 14. Insert panel of upper arm; 15. Connecting plate of lower arm; 16. Insert panel of lower arm; 17. Bandage.

A follow-up control device for exoskeleton robot, as shown in FIG. 1, includes an upper arm 1 and a lower arm 3, which are connected by a joint 2. As shown in FIG. 3, the upper arm 1 comprises three layers of upper arm connecting plate 13 and two layers of upper arm insert panel 14 that are alternatively stacked together, and the lower arm 3 comprises two layers of lower arm connecting plate 15 and three layers of lower arm insert panel 16 that are alternatively stacked together. The upper arm connecting plate remains consistent in length with the upper arm insert panel. The lower end of upper arm connecting plate extends downward and the upper end of upper arm insert panel extends upward such that these two ends are staggered. Correspondingly, the lower arm connecting plate remains consistent in length with the lower arm insert panel. The upper end of lower arm connecting plate extends upward and the lower end of lower arm insert panel extends downward such that these two ends are staggered. After the lower end of upper arm connecting plate 13 is inserted with the upper end of lower arm connecting plate, joint pins can be interconnected into a joint 2. As shown in FIG. 3, the downside on upper end of upper arm connecting plate 13 protrudes outward to form a power installation position and the left side of lower arm connecting plate 15 protrudes outward to form a power installation position. An electric cylinder 4 can be provided as power source between the upper arm power installation position and the lower arm power installation position. The rear end of a cylinder body of the electric cylinder is connected with the upper arm power installation position, and the terminal end of piston rod extended from the front end of cylinder body is connected with the lower arm power installation position. In addition, the cylinder body is provided with a motor 5 on downside of the rear end. A power device is provided between the motor and the cylinder body for power transmission.

The upper arm is equipped with an active lock block 6 on the front side face that can be bound with human body to slide along the direction in vertical with the upper arm axis, and the corresponding position on upper arm is provided with two micro switches 10 to detect the sliding position of the active lock block. As shown in FIG. 1, two limit bars 11 are designed in parallel at the axis direction, vertical to the upper end of upper arm, and a micro switch 10 is designed on both ends to slightly protrude from the top of the limit bars. As the active lock block, a sliding frame 8 is installed to slide along outer side of the limit bar. In addition, the distance between two inner ends of the sliding frame 8 is slightly larger than that between outer ends of two micro switches to ensure the sliding frame can only actuate one micro switch at the same time. The sliding frame is provided with a connecting hole 9 on both ends that can be bound with human body. The limit bars are also designed with side sealing plate 7 on front side to protect micro switches and prevent sliding frame from spalling. Moreover, a thread hole 12 is designed on the upper arm between two limit bars and micro switches for the signal wire of micro switches to thread through the upper arm.

Figure 2:
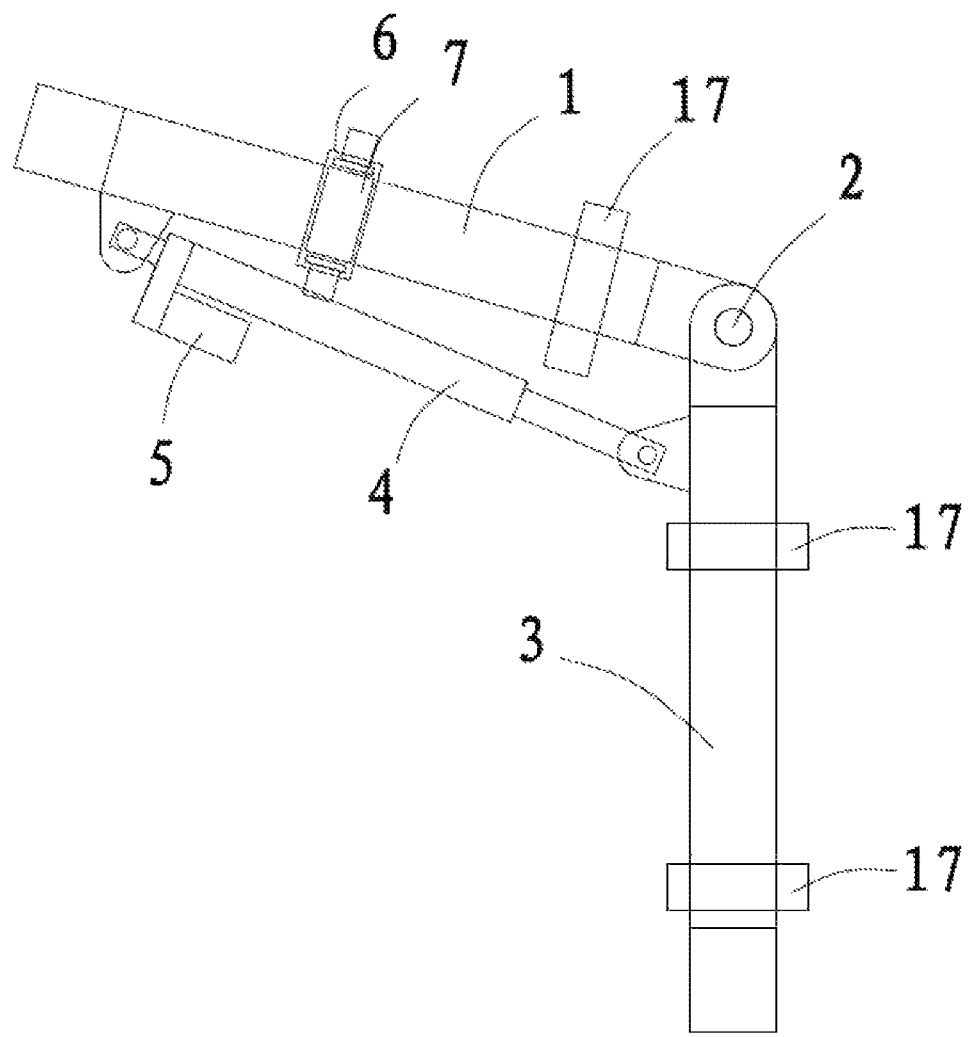
FIG. 2 is a structural diagram of active lock block and micro switches mentioned in the present invention.

As shown in FIG. 1 and FIG. 2, the active lock block on upper arm of exoskeleton robot is bound with the upper arm of human body, the upper arm of exoskeleton robot is bound with the upper arm of human body through a bandage 17 near lower end of the joint, and the lower arm of exoskeleton robot is bound with the lower arm of human body through a bandage 17 at upper and lower ends, respectively. When human body walks, the extension generated between upper and lower arms of human body will drive the active lock block to slide, thus actuating one of the micro switches for the operating cylinder to drive the upper and lower arms of exoskeleton robots into highly coordinated and synchronized motion along with body movement active lock block.

What is claimed is:

1. A follow-up control device for an exoskeleton robot, comprising:
   an upper arm; and
   a lower arm,
   wherein
   a lower end of the upper arm is connected to an upper end of the lower arm by a rotatable joint,
   one of the upper arm or the lower arm is equipped with an active lock block, the active lock block is configured to slide vertically in an axial direction of the one of the upper arm or the lower arm,
   the one of the upper arm or the lower arm is provided with two switches with opposite actuating directions to correspond with the active lock block,
   the active lock block can only trigger one of the two switches at the same time,
   a power device is provided between the upper arm and the lower arm to rotate the upper arm and the lower arm, and
   the two switches control motion of the power device in positive and reverse directions, respectively.

2. The follow-up control device for exoskeleton robot according to claim 1, wherein the power device is an electric cylinder including a cylinder body, a piston rod and a motor, ends of both the cylinder body and the piston rod are connected to the upper arm and the lower arm, respectively, and the motor is installed at one side of the cylinder body.

3. The follow-up control device for exoskeleton robot according to claim 1, wherein the upper arm and the lower arm are made of multiple layers of connecting plates and insert panels, the connecting plates and the insert panels have consistent thickness and are alternatively stacked together, and an end of the connecting plates toward the rotatable joint extends farther than an end of the insert panels toward the rotatable joint.

4. The follow-up control device for exoskeleton robot according to claim 3, wherein an upper end of the insert panel on the upper arm extends farther than that of the connecting plate on the upper arm, and a lower end of the insert panel on the lower arm extends farther than that of the connecting plate on the lower arm.

5. The follow-up control device for exoskeleton robot according to claim 1, wherein the two switches are disposed on a lateral side of the upper arm, two limit bars are disposed vertical to the axial direction on the lateral side of the upper arm, the two switches are respectively disposed at end portions of the two limit bars between the two limit bars and protrude beyond the end portions of the two limit bars, the active lock block is a sliding frame, the sliding frame is installed at both sides of the two limit bars to slide along the two limit bars, and a distance between two inner ends of the sliding frame is larger than that between outer ends of the two switches.

6. The follow-up control device for exoskeleton robot according to claim 5, wherein side sealing plates are provided on lateral sides of the two limit bars to protect the two switches and prevent the sliding frame from falling off.

7. The follow-up control device for exoskeleton robot according to claim 5, wherein both ends of the sliding frame are provided with connecting holes.

8. The follow-up control device for exoskeleton robot according to claim 5, wherein the power device is an electric cylinder including a cylinder body, a piston rod and a motor, ends of both the cylinder body and the piston rod are connected to the upper arm and the lower arm, respectively, and the motor is installed at one side of the cylinder body.

9. The follow-up control device for exoskeleton robot according to claim 5, wherein the upper arm and the lower arm are made of multiple layers of connecting plates and insert panels, the connecting plates and the insert panels have consistent thickness and are alternatively stacked together, and an end of the connecting plates toward the rotatable joint extends farther than an end of the insert panels toward the rotatable joint.

10. The follow-up control device for exoskeleton robot according to claim 1, wherein the two switches are disposed on a lateral side of the lower arm, two limit bars are disposed vertical to the axial direction on the lateral side of the lower arm, the two switches are respectively disposed at end portions of the two limit bars between the two limit bars and protrude beyond the end portions of the two limit bars, the active lock block is a sliding frame, the sliding frame is installed at both sides of the two limit bars to slide along the two limit bars, and a distance between two inner ends of the sliding frame along a direction vertical to the axial direction is larger than that between outer ends of the two switches.

11. The follow-up control device for exoskeleton robot according to claim 10, wherein side sealing plates are provided on lateral sides of the two limit bars to protect the two switches and prevent the sliding frame from falling off.

12. The follow-up control device for exoskeleton robot according to claim 10, wherein both ends of the sliding frame are provided with connecting holes.

13. The follow-up control device for exoskeleton robot according to claim 10, wherein the power device is an electric cylinder including a cylinder body, a piston rod and a motor, ends of both the cylinder body and the piston rod are connected to the upper arm and the lower arm, respectively, and the motor is installed at one side of the cylinder body.

14. The follow-up control device for exoskeleton robot according to claim 10, wherein the upper arm and the lower arm are made of multiple layers of connecting plates and insert panels, the connecting plates and the insert panels have consistent thickness and are alternatively stacked together, and an end of the connecting plates toward the rotatable joint extends farther than an end of the insert panels toward the rotatable joint.

* * * * *